United States Patent [19]

Heideman et al.

[11] Patent Number: 4,771,866
[45] Date of Patent: Sep. 20, 1988

[54] SHOCK ABSORBER WITH PROXIMITY SWITCH

[75] Inventors: Robert J. Heideman, Westland; Virgil J. Van Parys, Farmington Hills, both of Mich.

[73] Assignee: Enertrols, Inc., Farmington Hills, Mich.

[21] Appl. No.: 54,106

[22] Filed: May 20, 1987

Related U.S. Application Data

[63] Continuation of Ser. No. 848,841, Apr. 3, 1986, abandoned, which is a continuation of Ser. No. 558,319, Dec. 5, 1983, abandoned.

[51] Int. Cl.⁴ .................. F16D 66/00; F16F 9/48; F01B 25/26; B23Q 17/00
[52] U.S. Cl. .................. 188/1.11; 92/5 R; 116/230; 188/287; 338/32 H
[58] Field of Search .......... 188/1.11, 281, 284, 188/285, 287, 299, 319; 248/550, 566; 91/1; 116/202, 230, 283; 338/32 H; 324/220, 207, 208; 92/5 R; 73/121; 340/69

[56] References Cited

U.S. PATENT DOCUMENTS

| 3,524,634 | 8/1970 | Schmidt | 92/5 R X |
|---|---|---|---|
| 3,649,286 | 3/1972 | Mauron | 188/1.11 |
| 3,833,094 | 9/1974 | Grossman | 188/1.11 |
| 3,948,359 | 4/1976 | Rogers | 188/1.11 |
| 3,975,706 | 8/1976 | Kato | 188/1.11 |
| 4,086,456 | 4/1978 | Bone | 92/5 R X |
| 4,141,572 | 2/1979 | Sorensen | 188/1.11 |
| 4,163,970 | 8/1979 | Allinquant et al. | 188/1.11 |
| 4,176,586 | 12/1979 | Stoll et al. | 92/5 R |
| 4,321,987 | 3/1982 | Dressell et al. | 188/285 |
| 4,385,297 | 5/1983 | Schmitt et al. | 324/208 X |
| 4,398,704 | 8/1983 | Buchanan et al. | 338/32 H X |
| 4,471,304 | 9/1984 | Wolf | 338/32 H X |
| 4,482,035 | 11/1984 | Heideman et al. | 188/285 |
| 4,584,577 | 4/1986 | Temple | 324/208 X |

FOREIGN PATENT DOCUMENTS

| 2059592 | 11/1979 | Fed. Rep. of Germany | 92/5 R |
|---|---|---|---|
| 2485132 | 12/1981 | France | 188/1.11 |
| 0192606 | 11/1982 | Japan | 92/5 R |
| 0008806 | 1/1983 | Japan | 92/5 R |

*Primary Examiner*—Andres Kashnikow
*Assistant Examiner*—Robert J. Oberleitner
*Attorney, Agent, or Firm*—Krass & Young

[57] ABSTRACT

A shock absorber includes a piston slidably mounted in a fluid cylinder for decelerating the motion of an object acting on the shock absorber. A metering mechanism adjusts the rate at which fluid escapes from the cylinder upon displacement of the piston caused by impact of the object. A proximity sensor disposed in the end of the cylinder provides an indication of when the piston reaches a displacement position corresponding to a stroke length in which maximum energy is transferred from the object to the fluid. The proximity sensor includes an electrical probe extending through the end wall of the cylinder and possesses an electrical property whose magnitude varies in accordance with the distance between the piston and the probe.

4 Claims, 2 Drawing Sheets

SHOCK ABSORBER WITH PROXIMITY SWITCH

This is a continuation of co-pending application Ser. No. 848,841 filed Apr. 3, 1986, now abandoned which is a continuation of co-pending application Ser. No. 558,319 filed on Dec. 5, 1983 now abandoned.

DESCRIPTION

1. Technical Field

The present invention broadly relates to adjustable, piston-type shock absorbers and deals more particularly with a device for sensing the position of the piston in a manner which allows adjustment so as to effect maximum energy absorption.

2. Background Art

Shock absorbers having controlled fluid metering for altering the rate at which the shock absorber absorbs energy from a moving object are well known in the art. U.S. Pat. No. 4,321,987 issued Mar. 30, 1982, discloses a shock absorber having an adjustable fluid metering system of the type mentioned above. Although entirely satisfactory for some applications, the prior art shock absorber described in this prior patent is subject to improvement in several respects discussed hereinbelow.

In connection with fluid type shock absorbers, it is generally desirable to maximize the degree of displacement of the fluid piston, without allowing the piston to "bottom out". Maximum piston displacement allows a maximum amount of energy to be absorbed by the shock absorber, while on the other hand if the piston is allowed to "bottom out" the moving object is not decelerated smoothly and damage may result to the piston and/or cylinder. The velocity of the mass which impacts the shock absorber creates fluid displacement through orifices in the absorber causing an internal fluid pressure. This pressure times the area of the piston results in a deceleration force which acts in opposition to the impacting force and is maintained until the mass comes to rest.

As mentioned above, the prior art shock absorbers include a mechanism for adjusting the metering of fluid through the orifices when a moving mass displaces the piston. An adjustment setting which allows the fluid to pass through the orifices relatively freely reduces the fluid back pressure in the cylinder during displacement of the piston, thereby allowing the piston to be displaced to a fully closed position with a lesser amount of impacting force from the mass. By adjusting the metering mechanism such that less fluid back pressure is created within the cylinder, the amount of primary driving force from the mass required to display the piston a given distance is increased. Since a given type of shock absorber may be used in various applications where primary driving force from the mass is variable, it is necessary to adjust the metering mechanism for each particular application. This adjustment process is complicated by the fact that energy dissipation by the shock absorber as a function of velocity is exponential, rather than linear.

Heretofore, metering adjustment has been substantially by trial and error. The metering mechanism was normally adjusted until the piston "bottomed out" within the cylinder and then was increased slightly to prevent bottoming out. This approach to the problem was not only time consuming but was also somewhat unreliable since some variation in the primary force is not uncommon, in addition to the fact that the piston and/or cylinder can be damaged by bottoming out during the adjustment process.

Sensing of the piston position is complicated by several additional factors. That part of the fluid chamber in which the sensor might be located is subjected to extremely high pressures, e.g., 5,000 psi or more and the sensor is therefore prone either to fail under pressure or allow leakage around seals surrounding the sensor. Sensing of the piston position by a mechanical mechanism disposed outside of the cylinder is impractical in many applications which require a compact shock absorber construction and such mechanisms are also rather unreliable.

It is therefore a primary object of the present invention to overcome each of the deficiencies of the prior art discussed above.

Another primary object of the invention is to provide a fluid operated shock absorber having an adjustable fluid metering mechanism including a proximity sensor for providing an indication when the piston reaches a preselected position of displacement such that the shock absorber absorbs a maximum amount of energy.

Another object of the invention is to provide a shock absorber as described above which is extremely compact and reliable.

Another object of the invention is to provide a shock absorber as described above in which the proximity sensor is mounted in the end of a shock absorber cylinder and includes a probe which extends into the cylinder.

These, and further objects of the invention, will be made clear or will become apparent during the course of a description of a preferred embodiment of the invention set out hereinbelow.

SUMMARY OF THE INVENTION

According to the present invention, a fluid operated shock absorber includes a piston slidably mounted in a cylinder which defines a pressurized fluid chamber. The piston is connected by a piston rod to a button which is adapted to be engaged by a primary moving object whose movement is to be decelerated. The cylinder includes a plurality of openings therein through which fluid may escape during displacement of the piston. A perforated sleeve surrounding the cylinder adjusts the rate of flow through the cylinder openings, thus metering the rate at which energy is absorbed from the object. A proximity sensor is mounted on the end of the cylinder and includes an electrical probe which extends through a wall of the cylinder and communicates with the fluid pressure chamber. The probe includes a sensing element which possesses an electrical quality whose magnitude varies in accordance with the distance between the probe and the piston. When the piston reaches a preselected displacement short of "bottoming out" and at which a maximum amount of energy has been transferred to the fluid from the object, the probe senses the piston's position and provides an audible or visible signal to indicate that a proper metering setting has been achieved.

BRIEF DESCRIPTION OF THE DRAWINGS

In the drawings which form an integral part of the specification, and are to be read in conjunction therewith, and in which like reference numerals are employed to designate identical components in various views.

DETAILED DESCRIPTION OF THE SPECIFIC EMBODIMENTS

Figures 1, 2, 3:
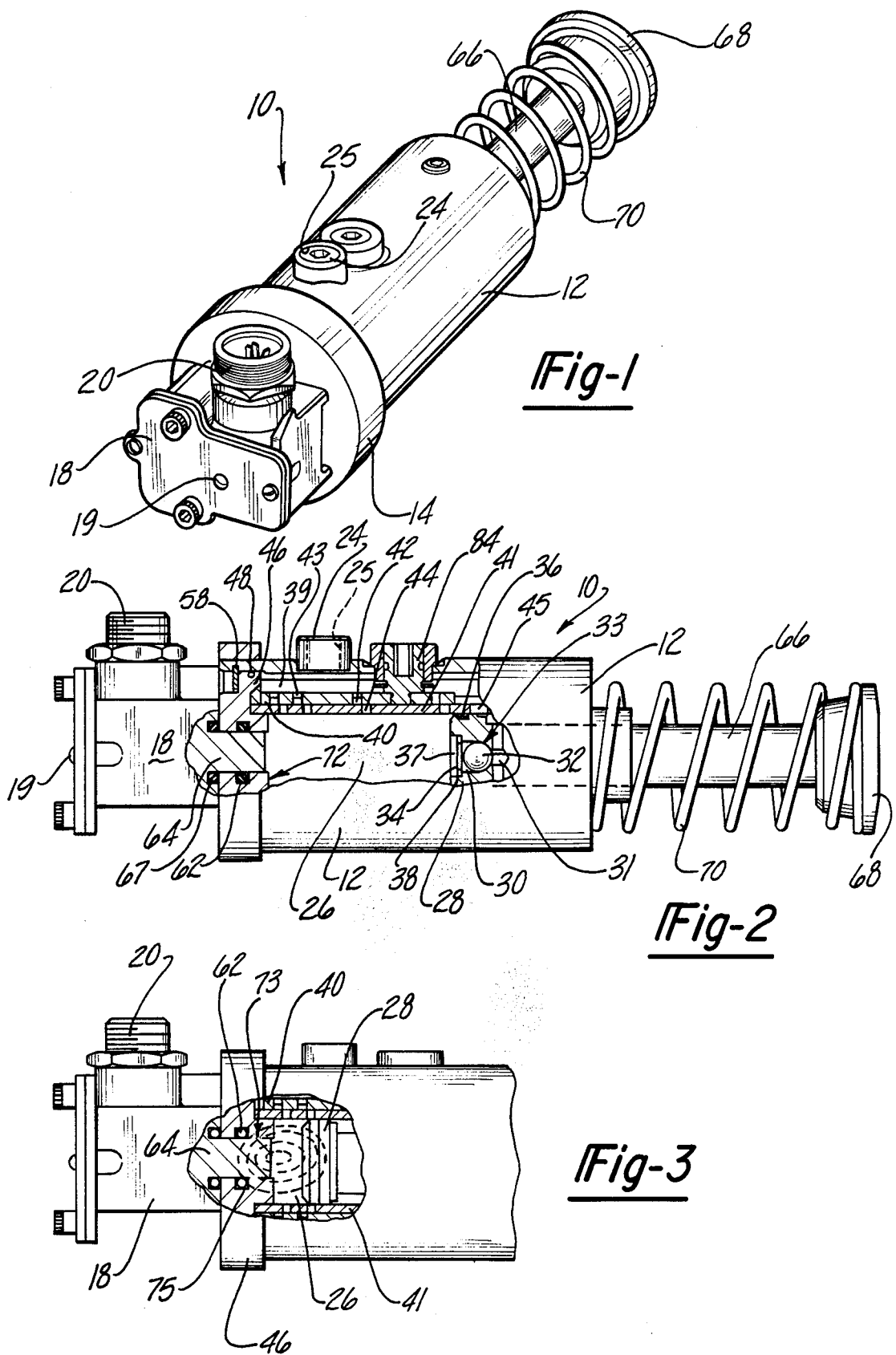
FIG. 1 is a perspective view of a shock absorber having a proximity sensor in accordance with the preferred embodiment of the present invention.
FIG. 2 is a longitudinal view of the shock absorber shown in FIG. 1, parts being broken away in section to show the internal constructions; the piston being depicted in a standby open position prior to actuation thereof.
FIG. 3 is a fragmentary view of one end of the shock absorber shown in FIGS. 1 and 2, but depicting the piston in a displaced, closed position where its location is detected by the proximity sensor.

Referring to the drawings, the present invention is broadly concerned with a fluid type shock absorber generally indicated by the numeral 10. The shock absorber 10 is broadly similar in construction to that disclosed in U.S. Pat. No. 4,482,035 filed Sept. 23, 1982 owned by the same assignee as herein, the entire disclosure of which is incorporated herein by reference. The shock absorber 10 includes a cylindrical tube 12, the rear end of which is closed off by a cylindrical cap 46 which is closely received within the end of the tube 12. An O-ring 48 fitted in a groove of the outer perimeter of cap 46 bears against the inner wall of tube 12 to provide a fluid seal. A split, steel retaining ring 58 fits in a groove in the inner wall of the tube 12 to secure the cap 46 within the tube 12. A radially extending outer flange 14 surrounding the tube 12 provides a means of mounting the shock absorber to a suitable surface.

A tubular metering cylinder 41 is secured to and extends forwardly from the cap 46 into the tube 12. The outer diameter of cylinder 41 is substantially smaller than that of the inner diameter of the tube 12, so that an annular void space 39 is formed therebetween. A perforated sleeve 40 is rotatably mounted on cylinder 41 for purposes which will be later discussed.

A piston head 28 is slidably mounted within a fluid pressure chamber 26 defined within cylinder 41. An elongate piston rod 66 secured to the piston head 28 extends forwardly through cylinder 41 and outwardly beyond the forward end of tube 12. At the forward end, the piston rod 66 carries a button 68 which acts to bear against a workpiece or machine part to be decelerated by the shock absorber 10. A spiral spring 70 extends between the rear side of the button 68 and the forward end of tube 12, and acts to return the piston rod 66 to its normal standby, extended position after the machine part is moved away from the shock absorber 10.

The piston head 28 is preferably formed integral with piston rod 66 and includes a groove on the outer diameter thereof which receives a piston ring 36 that bears against the inner diameter of the cylinder 41. Piston head 28 is formed with a central opening 30 on its rear end which communicates at its forward end with a T-shaped passageway 31 in rod 66. The concave surface 33 between the central opening 30 and passageway 31 acts as a seat for a ball check valve 32. An apertured retainer 34 extends over the opening 30 and is secured in place by a retainer ring 38 to hold the check valve 32 in place while allowing fluid to flow between the opening 30 and the fluid chamber 26. The retainer 34 is provided with a circular, rearwardly projecting metal land 37 whose purpose will become apparent hereinafter. When the piston 28 moves rearwardly under the influence of a force exerted on the button 68 by a machine part, the central opening 30 and passageway 31 are sealed by the ball check valve 32 and, when the piston 28 moves in a forward direction under the force of the spiral spring 70, a free flow path is established through the retainer 34, opening 30 and passageway 31.

As disclosed in the patent application mentioned hereinabove, passageway 31 may communicate through an opening 45 in the wall of cylinder 41 to an accumulator system in the void space 39 which includes an accumulator pad formed of cellular plastic filled with nitrogen to provide a high degree of resilience.

A plurality of straight sided, circular fluid ports 44 are formed radially through the wall of cylinder 41. Fluid ports 44 are in longitudinal alignment with each other and the spacing therebetween may be offset at exponential decreasing distances in the direction of the rear of the cylinder 41. Sleeve 40 is provided with a plurality of straight sided, axially skewed grooves, 42 formed along the interior diameter of the sleeve circular holes which are registerable with ports 44 to form metering orifices of infinitely adjustable size. The grooves are connected to void 39 by holes 43. The orientation of the cylinder 41 relative to sleeve 40 controls the amount of overlapping registration of ports 44 with the grooves 42 and may be adjusted by means of a cam-type adjuster mechanism 84.

The tube 12 is provided with an access port 24 in its sidewall which communicates with the interior volume adjacent the accumulator system. Port 24 may be sealed by a plug 25 so as to restrain the fluid flow within the tube 12 or may be used to connect the interior volume to an external accumulator. This arrangement allows for more efficient dissipation of the heat induced in the fluid as a result of the energy absorbed from the decelerating member.

As described in the aforementioned patent application, the geometry of the grooves 42 and ports 44 is such as to produce turbulent flow restriction, in turn offering certain advantageous results which form no part of the present invention and, therefore, need not be described here in detail.

End cap 46 is provided with a central, longitudinally extending passageway 73 which communicates with the fluid chamber 26 and defines an annular end wall 72 at the rear end of chamber 26. A proximity sensor 18 is mounted on the rear end of end cap 46 by any suitable means and may be provided with an electrical connector 20 to provide output signals to a remote location. Sensor 18 may comprise a conventional device such as that available from Namco Controls which is a division of Acme Cleveland of Cleveland, Ohio. Sensor 18 includes a cylindrical probe or pickup 64 comprising a shielded plastic containing electrical components which sense the position of the piston head 28 as will be described below. Sensor 18 may be provided with a capacitive pickup, inductive pickup, or magnetic pickup including hall-effect transducers. In the case of a hall-effect transducer, a tuned oscillator (not shown) is provided in the end of the probe 64. The oscillator is normally tuned, but is detuned when a ferrous metal part such as the projection 37 enters the transducer's magnetic field.

The probe 64 extends through the passageway 73 in the end cap 46 to a point spaced slightly from the fluid chamber 26. Becaue the probe 64 is shielded, the magnetic field produced thereby, indicated by the dashed lines 75 in FIG. 3, is highly longitudinally directional; consequently, magnetic fields and ferrous masses in the surrounding area are not sensed by the probe 64 and, therefore, do not result in the generation of false signals. Sensor 18 includes an indicator light 19 which is normally illuminated when the probe 64 fails to detect a ferrous mass. End cap 46 is provided with a groove in the inside diameter thereof which receives O-ring 62 bearing against the probe 64. O-ring 62 effectively seals the rear end of the fluid chamber 26. In lieu of O-ring 62 or in addition thereto, sealing can be accomplished by an O-ring 67 captured between end cap 46 and a cavity wall in sensor 18.

In operation, the first task in readying the shock absorber 10 for a particular application involves adjusting the metering mechanism thereof; i.e., the orifice area through ports 44 and grooves 42 in order to achieve proper energy dissipation during deceleration of the moving part or workpiece. In order to maximize the energy absorption, it is desirable that the piston 28 be displaced a maximum distance toward the rear end of the cylinder 41 without allowing the piston 28 to "bottom out" on the end wall 72. Consequently, it is desirable to produce piston displacement which stops within approximately 1/32 of an inch from end wall 72. Toward this end, the sensor 18 is calibrated so as to sense the presence of the projection 37 on piston 28 when piston 28 is within approximately 1/32 of an inch from end wall 72. As previously stated, the indicator light 19 is normally on; when the projection 37 is sensed by probe 64, probe 64 produces a signal which turns off the indicator light 19, thus indicating to the person callibrating the unit that the piston head 28 is within approximately 1/32 of an inch from the end wall 72. Recalling now that the relative position of the sleeve 40 and cylinder 41 affect the rate at which fluid is allowed to escape from the chamber 26 to the volume 39, it can be appreciated that varying degrees of energy dissipation will be achieved depending on the rate at which fluid is allowed to escape from chamber 26. Thus, it is a simple matter in an actual operating environment to adjust the fluid metering rate by simply turning the adjuster mechanism cam 84 to produce the displacement of piston head 28 necessary to turn off light 19.

Figure 4:
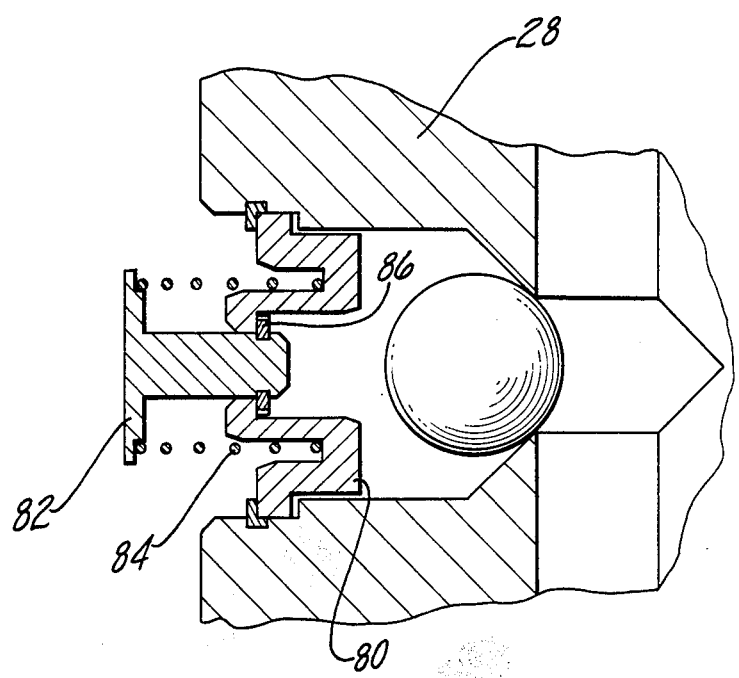
FIG. 4 is a longitudinal view of an alternative embodiment of the piston head assembly shown in FIGS. 1, 2 and 3.

An alternative embodiment, shown in FIG. 4 gives the sensor greater proximity range. The retainer 34 and metal land 37 (shown in FIG. 2) are replaced by a retainer 80 and a circular, T-shaped metal plunger 82. The plunger 82 is biased rearwardly by a coil spring 84 and held within the retainer 80 using a retainer ring 86.

Preferably, the head of the plunger 82 is displaced approximately ⅛ of an inch from the bottom of the piston head 28. The retainer 80 is generally of rectangular cross section having arcuate ends for proper fit and retention within the piston head 28. The shape of the retainer 80 permits passage of fluid between the passageway 31 and the fluid chamber 26. In operation, the spring 84 maintains the plunger 82 in its rearwardly extended state as the piston head 28 is displaced toward the end wall 72. When the plunger is within approximately 1/32 of an inch from the end wall 72, the probe 64 detects its presence. The probe 64 therefore produces a signal which turns off indicator light 19 thus providing an indication that the piston head is near the end wall 72. However, because the plunger 82 is displaced from the bottom of the piston head 28, the piston head is still approximately 5/32 of an inch from the end wall 72. The sensor thus provides a detection signal at a greater proximity range. If the piston head 28 is displaced further toward the end wall, the face of the plunger 82 will contact the end wall 72. Thereafter, as piston head 28 approaches the end wall 72, the spring 84 compresses allowing the piston head 28 to be displaced further toward the end wall 72. The retainer 80 is set into the bottom of the piston head 82 to form a recessed area so that when the piston head "bottoms out", plunger 82 will fit within the recess without contacting the piston head 28 or base of the retainer 80.

From the foregoing, it can be appreciated that the shock absorber and proximity sensor described above not only provide for the reliable accomplishment of the objects of the invention, but do so in a particularly efficient and economical manner. It is recognized, of course, that those skilled in the art may make various modifications or additions to the preferrd embodiment chosen to illustrate the invention without departing from the spirit and scope of the present contribution to the art. Accordingly, it is to be understood that the protection sought and to be afforded hereby be deemed to extend to the subject matter claimed and all equivalents thereof fairly within the scope of the invention.

We claim:

1. A shock absorber for decelerating the movement of a moving object comprising:
    (A) an outer tubular member having a central axis;
    (B) an inner tubular member positioned coaxially within the outer tubular member and having an open front end;
    (C) an annular rear end wall closing the rear end of said inner and outer tubular members and including a central through aperture positioned on said central axis and opening into the rear end of said inner tubular member;
    (D) a piston assembly including a piston rod and a piston head, said piston rod extending into the open front end of said inner tubular member to position the rear end thereof within said inner tubular member and position the front end thereof outside of said inner tubular member for impact by the moving object, said piston head being rigid with said front end of said piston rod and slidably displaceable within said inner tubular member towards said rear end wall during a working stroke and toward the open front end of said inner tubular member during a return stroke;
    (E) means defining a closed fluid loop within said shock absorber including metering orifice means;
    (F) adjustment means for varying the setting of said metering orifice means and thereby varying the resistance to fluid flow through said fluid loop;
    (G) a proximity sensor mounted on the rear end of said shock absorber on said rear end wall and including a main body portion positioned rearwardly of the rear exterior face of said rear end wall and a forwardly extending probe portion positioned in said central aperture in said rear end wall in communication with the interior of said inner tubular member and operative to establish a directionally electrical field extending axially forwardly into said inner tubular member from said rear end wall; and
    (H) signal means operative in response to entry of the leading end of said piston assembly into said electrical field during working stroke movement of said piston head toward said rear end wall to generate a visual or audible signal indicative of such entry, whereby said shock absorber may be calibrated for a given impact loading application by adjusting said adjustment means until a signal is generated indicating arrival of said piston assembly under such given impact loading at a desired predetermined clearance distance from said rear end wall.

2. A shock absorber for decelerating the movement of a moving object comprising:

(A) an outer tubular member;

(B) an inner tubular member positioned within the outer tubular member and having an open front end and a closed rear end defined by a rear end wall of said inner tubular member;

(c) a piston assembly including a piston rod and a piston head, said piston rod extending into the open front end of said inner tubular member to position the rear end thereof within said inner tubular member and position the front end thereof outside of said inner tubular member for impact by the moving object, said piston head being rigid with said front end of said piston rod and slidably displaceable within said inner tubular member toward said rear end wall of said inner tubular member during a working stroke and toward the open front end of said inner tubular member during a return stroke;

(D) means defining a closed fluid loop within said shock absorber including metering orifice means;

(E) adjustment means for varying the setting of said metering orifice means and thereby varying the resistance to fluid flow through said fluid loop;

(F) a generally central aperture in said rear end wall;

(G) a proximity sensor mounted on the rear end of said shock absorber on said rear end wall and including a forwardly extending probe positioned in said aperture in said rear end wall in communication with the interior of said inner tubular member with the forward end of said probe spaced rearwardly from the front interior face of said rear end wall, said probe being operative to establish a directional electrical field extending axially forwardly into said inner tubular member from said rear end wall; and (H) signal means operative in response to entry of the leading end of said piston assembly into said electrical field during working stroke movement of said piston head toward said rear end wall to generate a visual or audible signal indicative of such entry, whereby said shock absorber may be calibrated for a given impact loading application by adjusting said adjustment means until a signal is generated indicating arrival of said piston assembly under such given impact loading at a desired predetermined clearance distance from said rear end wall.

3. A shock absorber according to claim 2 wherein:

(J) said proximity sensor includes an indicator light which is normally energized but which is deenergized in response to entry of the leading end of said piston assembly into said electrical field.

4. A shock absorber according to claim 2 wherein:

(J) said proximity sensor includes a tuned oscillator which generates said electrical field and which is detuned in response to entry of the leading end of said piston assembly into said electrical field.

* * * * *